Nov. 15, 1960  J. H. ERICKSON ET AL  2,960,125
DEPTH OF CUT GAUGE FOR JOINTER
Filed March 25, 1959

John H. Erickson,
Benny S. Vineyard,
Inventors.
Koenig and Pope,
Attorneys.

United States Patent Office 2,960,125
Patented Nov. 15, 1960

2,960,125

DEPTH OF CUT GAUGE FOR JOINTER

John H. Erickson and Benny S. Vineyard, Carbondale, Ill., assignors to Southern Illinois University Foundation, Carbondale, Ill., a corporation of Illinois Filed Mar. 25, 1959, Ser. No. 801,942

2 Claims. (Cl. 144—129)

This invention relates to gauges for machine tools, and more particularly to a depth gauge for a woodworking machine of the class referred to as a jointer.

It will be understood that a jointer conventionally comprises a rotatably cutterhead carrying knives for planing a workpiece, an infeed table over which the workpiece is fed to the cutterhead by sliding the workpiece over the infeed table, and an outfeed table over which the workpiece slides as it passes the cutterhead. The infeed table is vertically adjustable for adjusting the elevation of its upper surface (on which the workpiece slides) relative to the cutting plane of the cutterhead (and the surface of the outfeed table) thereby to determine the depth of the planing cut to be taken. Among the several objects of this invention may be noted the provision of an improved gauge for indicating the elevation of the surface of the infeed table relative to the cutting plane of the cutter head and the outfeed table thereby to indicate the depth of cut, the gauge being extremely sensitive so as to enable the operator of the machine to make finer settings than possible with prior gauges; the provision of a gauge such as described which is highly accurate and easy to read, being so constructed that it may be readily read from above the jointer; the provision of a gauge such as described which may be readily adjusted or reset when necessary due to sharpening of the knives; and the provision of a gauge which while having the stated advantageous features is easy to use and of economical construction. Other objects and features will be in part apparent and in part pointed out hereinafter.

The invention accordingly comprises the constructions hereinafter described, the scope of the invention being indicated in the following claims.

Figure 1:
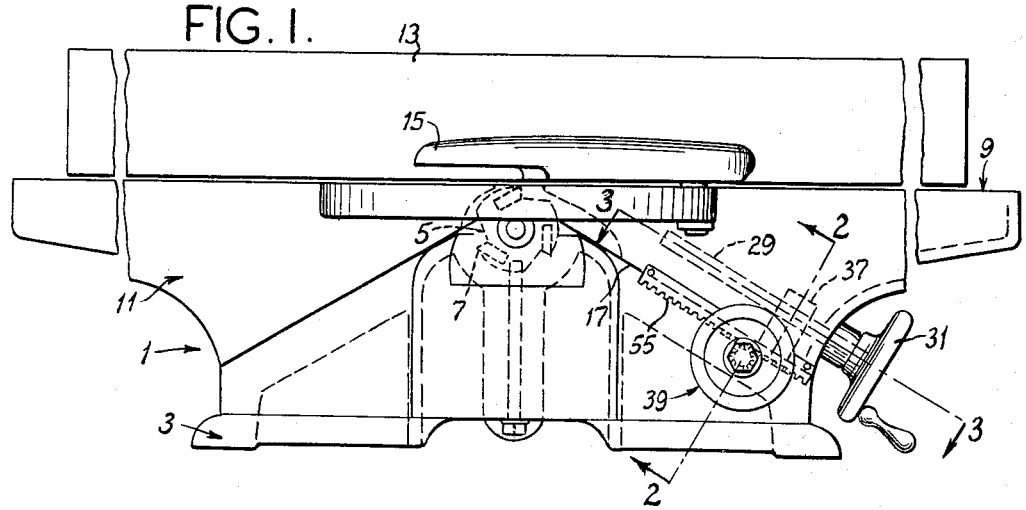
Figure 2:
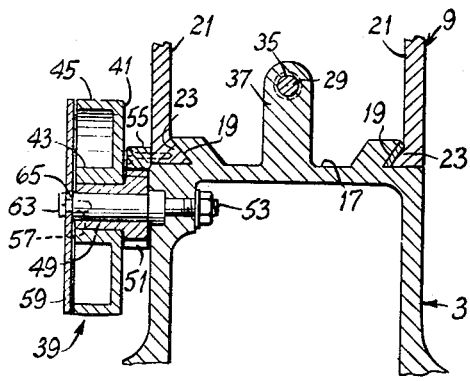
Figure 4:
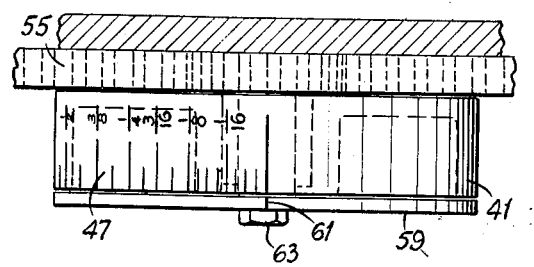
Figure 3:
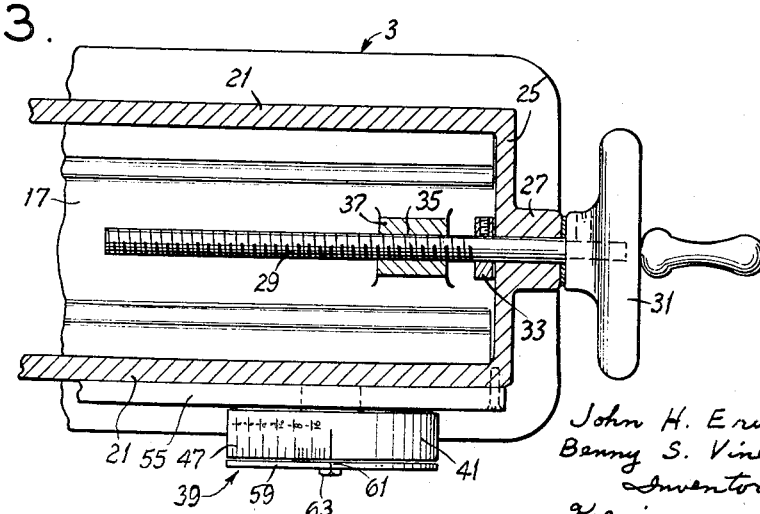

In the accompanying drawings, in which one of various possible embodiments of the invention is illustrated, Fig. 1 is a side elevation of a jointer provided with gauge means of this invention;

Figs. 2 and 3 are cross sections taken on lines 2—2 and 3—3, respectively, of Fig. 1; and Fig. 4 is an enlarged fragment of Fig. 3.

Corresponding reference characters indicate corresponding parts throughout the several views of the drawings.

Referring to the drawings, there is indicated at 1 a jointer comprising a base 3, a rotatable cutter head 5 carrying knives 7, an infeed table 9 and an outfeed table 11. At 13 is indicated the usual fence and at 15 the usual cutterhead guard. The base 3 has an inclined surface 17 having machined V-groove ways such as indicated at 19 at opposite sides thereof (see Fig. 2). The infeed table 9 has side walls 21 having inclined lower edge portions 23 slidable in the ways 19.

The infeed table has a rear wall 25 formed with a boss 27 in which is journalled a screw 29. This screw extends parallel to the inclined surface 17 of the base. It has a handle 31 fixed on its outer end outside of rear wall 25. A collar 33 fixed on the screw on the inside of rear wall 25 holds the screw against axial movement relative to the infeed table. The screw is threaded in a tapped hole 35 in a boss 37 on inclined surface 17 of base 3. The arrangement is such that by turning the screw in one direction, the infeed table is moved upward on inclined surface 17 of base 3 to raise it, and by turning the screw in the opposite direction, the infeed table is moved downward to lower it, thereby to set the infeed table for taking different depths of cut in workpieces.

The jointer 1 is provided with a gauge means 39 of this invention for indicating the setting of the infeed table in terms of the depth of cut. Gauge 39 comprises a scale constituted by a wheel 41 having a hub 43. Wheel 41 has a cylindrical periphery 45 bearing depth-of-cut scale markings such as indicated at 47, these markings including lines spaced at appropriate intervals around the periphery 45 of the wheel and extending to one edge of the periphery, and indicia denoting fractions of an inch, for example, opposite the respective lines. The hub 43 of the wheel is fixed as by press-fitting on the hub 49 of a pinion 51, the pinion being located on one side of the wheel. The pinion 51 and wheel 41, which are coaxial, are journalled on a stud 53 fixed in the base 3 and extending laterally outward from one side of the base, with the pinion on the inside of the wheel. Lines 47 then extend to the outside edge of the cylindrical periphery 45 of the wheel. A rack 55 is attached to the side of the infeed table 9 extending parallel to the inclined surface 17 of the base 3, pinion 51 being in mesh with the rack. The stud 53 has a tapped axial hole 57 in its outer end. An index means constituted by a disk 59 having an index mark 61 on its periphery for cooperation with scale markings 47 on the wheel is fixed on the outer end of the stud 53 coaxial with the stud on the outside of wheel 41 by means of a headed screw 63 extending through a center hole 65 in the disk and threaded in the hole 57 in the stud. The screw 63 may be tightened sufficiently for its head to hold the disk 59 against rotation on the end of stud 53.

The disk 59 is adjusted by loosening screw 63 and turning the disk to the position where the index mark 61 on the disk is aligned with the appropriate depth-indicating scale marking 47 on the periphery of the wheel 41, as may be determined by a preliminary accurate measurement of the difference in elevation of the surface of the infeed table and the cutting plane of the cutterhead 5. Then screw 63 is tightened to lock the disk in position. Then, upon any subsequent adjustment of the infeed table involving sliding the infeed table up or down on the inclined surface 17 of the base, rack 55, moving with the infeed table rotates pinion 51 and scale wheel 41 on stud 53 in one direction or the other. An indication of the adjustment, i.e., the depth of cut, may be obtained by reading the scale markings on the wheel against the index mark 61 on the fixed disk 59. The disk 59 is positioned so that index mark 61 is upward, consequently the reading may be obtained from above, thereby avoiding any necessity for the operator of the machine to stoop over, as is necessary with the gauges on many prior jointers.

The rack and pinion mechanism of the gauge provides for multiplication of the movement of the infeed table, so that the gauge is extremely sensitive and enables the operator to make fine settings. That is, a slight movement of the infeed table in one direction or the other results in a relatively large degree of movement of the scale markings on the scale wheel 41. The rack and pinion mechanism may be readily made to provide for high accuracy, and the gauge may be readily adjusted or reset when necessary simply by loosening the screw 63, adjusting the disk 59, and then tightening the screw.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. In a jointer having a base, a cutterhead, an infeed table and an outfeed table, said base having an inclined surface, said infeed table being slidable on said inclined surface to raise and lower said infeed table, and means for sliding said infeed table one way or the other on the base to adjust the infeed table for different depths of cut, gauge means for indicating the depth of cut comprising a rack on one side of the infeed table extending parallel to said inclined surface, a pinion carried by the base in mesh with the rack and rotatable by the rack on a horizontal axis in one direction or the other upon sliding of the infeed table, a wheel rotatable with the pinion on said horizontal axis and having scale marks on its periphery readable from above, and means providing a fixed index mark against which the scale marks on the wheel may be read carried by the base, said wheel being coaxial with the pinion and secured thereto and said index means being mounted for rotation coaxial with the wheel and pinion for adjustment of said index means relative to the wheel.

2. In a jointer having a base, a cutterhead, an infeed table and an outfeed table, said base having an inclined surface, said infeed table being slidable on said inclined surface to raise and lower said infeed table, and means for sliding said infeed table one way or the other on the base to adjust the infeed table for different depths of cut, gauge means for indicating the depth of cut comprising a rack on one side of the infeed table extending parallel to said inclined surface, a pinion carried by the base in mesh with the rack and rotatable by the rack on a horizontal axis in one direction or the other upon sliding of the infeed table, a wheel rotatable with the pinion on said horizontal axis and having scale marks on its periphery readable from above, and means providing a fixed index mark against which the scale marks may be read carried by the base, said wheel being coaxial with the pinion and secured thereto, said wheel and pinion being rotatable on a stud extending laterally outward from the base at one side thereof, said index means comprising a disk having an index mark on its periphery mounted on said stud at one side of said wheel and adapted for adjustment relative to the stud by rotation on the axis of the stud, said disk being mounted at the end of the stud by means of a screw extending through a center hole in the disk, and said screw being adapted to be loosened to permit the disk to be turned by adjustment and then tightened to lock the disk in adjusted position.

References Cited in the file of this patent

UNITED STATES PATENTS

| | | |
|---|---|---|
| 163,567 | Beall | May 25, 1875 |
| 717,454 | Rosen | Dec. 30, 1902 |
| 832,721 | Cromwell | Oct. 9, 1906 |
| 2,601,879 | Van Dam | July 1, 1952 |
| 2,804,107 | Taylor | Aug. 27, 1957 |